T. K. BUNGER.
LAWN MOWER.
APPLICATION FILED DEC. 30, 1916.

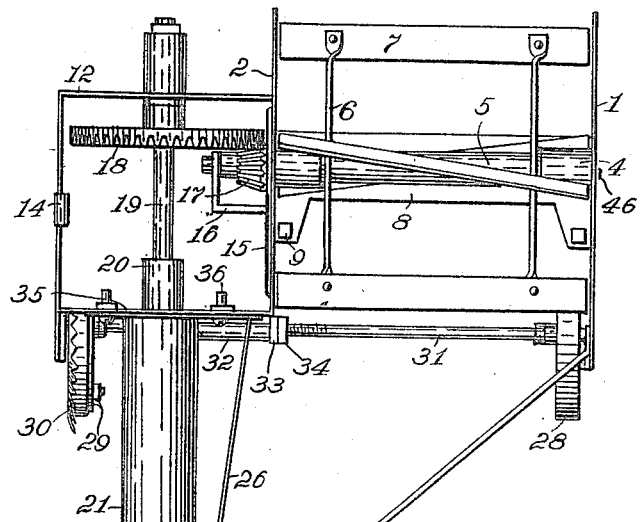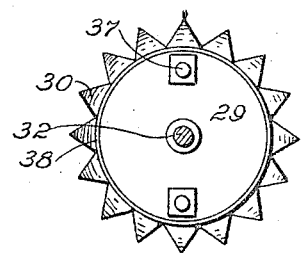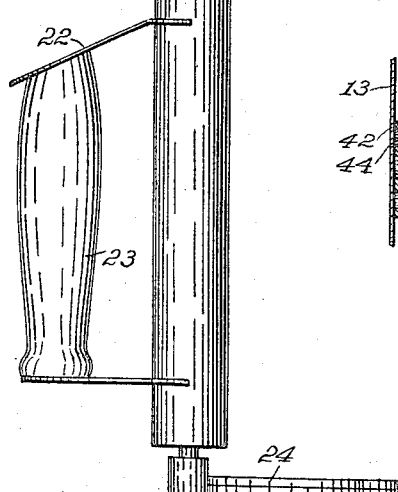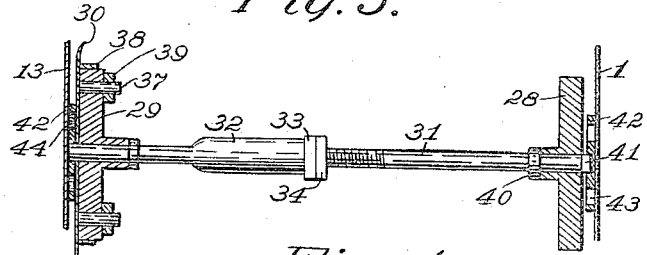

1,222,263.

Patented Apr. 10, 1917.
2 SHEETS—SHEET 2.

Inventor,
Tielko K. Bunger, by
G. C. Kennedy,
Attorney.

UNITED STATES PATENT OFFICE.

TIELKO K. BUNGER, OF WELLSBURG, IOWA.

LAWN-MOWER.

1,222,263.  Specification of Letters Patent.  Patented Apr. 10, 1917.

Application filed December 30, 1916. Serial No. 139,748.

*To all whom it may concern:*

Be it known that I, TIELKO K. BUNGER, a citizen of the United States of America, and a resident of Wellsburg, Grundy county, Iowa, have invented certain new and useful Improvements in Lawn-Mowers, of which the following is a specification.

My invention relates to improvements in lawn mowers, and the object of my improvement is to supply for a mower constructed especially to mow the edges of lawns, means for quickly adjusting the height of cut; a device for preventing side-slip on sloping surfaces, and generally, an improved structure in the frame and operating mechanism of the machine.

Figure 2:
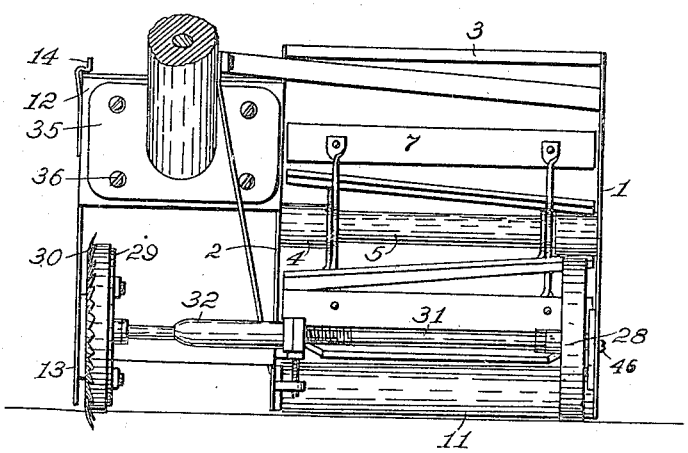
Figure 3:
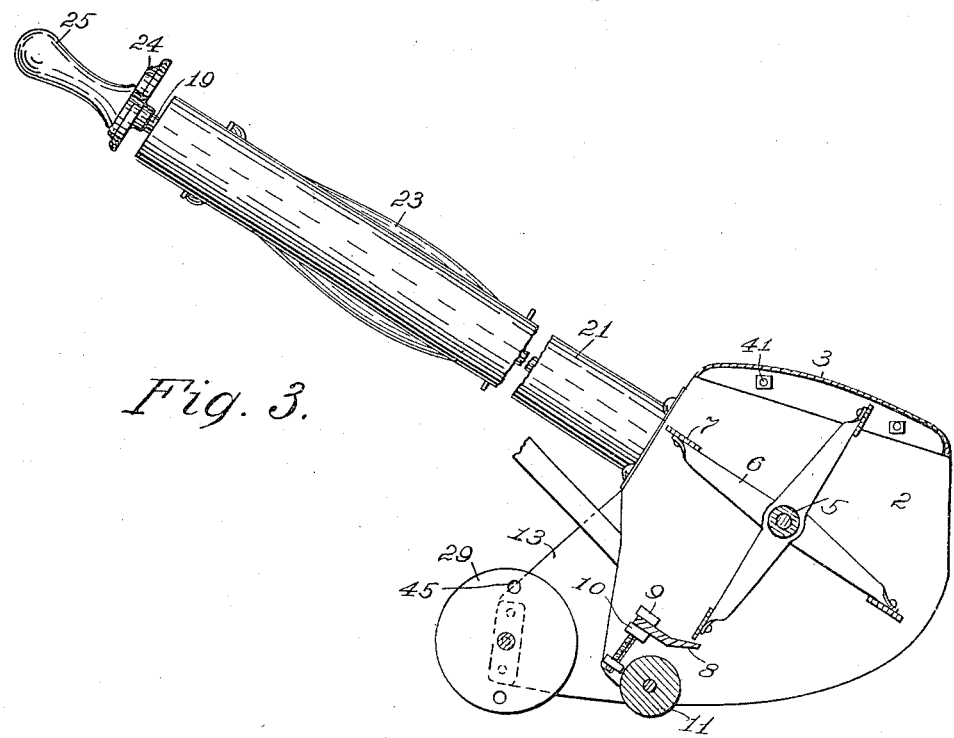

These objects I have accomplished by the means which are hereinafter described and claimed, and which are illustrated in the accompanying drawings, in which Figure 1 is a top plan view of the machine; Fig. 2 is a rear elevation thereof, with parts broken away; Fig. 3 is a longitudinal section thereof taken on the line a—b of Fig. 2; Fig. 4 is a detail elevation of the traveling-wheels and their mounting, including the dentated disk, parts being shown in section; and Fig. 5 is a side elevation of one of the traveling-wheels with said dentated disk mounted thereon.

Similar numerals of reference denote similar parts throughout the several views.

This mower is used to trim the edges of lawns, and is built small and compact in order to follow curves or enter corners. The frame is comprised of vertical spaced side-plates 1 and 2, connected above by a cover-plate 3 secured by bolts 41, the cover serving to keep overhanging twigs on branches away from the rotary cutting blades. These side-plates are also rigidly connected below by a cross-plate 8 adjustably pivoted on screws 46, whose forward edge is hardened and coöperates with the cutting-blades in the usual manner in grass-cutting or shearing. The ends of the cross-plate 8 are mounted on lugs 10, on the side-plates 1 and 2, and secured thereto by means of screws 9.

Under the cross-plate 8 is a ground-roller 11, whose ends are pivotally connected to the said side-plates. A rotatable shaft 5 is seated in bearings 4 on said side-plates, passing through an opening in the side-plate 2 and carrying a bevel-pinion 17 on its outer end, said end being supported in a bracket 16.

A boxing 12, open at the top, is fixedly mounted on the outer side of the side-plate 2, inclosing the pinion 17. A removable cover (not shown) is provided for the open top of said box, one edge passing under a ridge 15 on the side-plate 2, the opposite edge being detachably gripped by a spring-clip 14 secured on the outer face of said boxing.

Spiders 6 are fixed on the shaft 5 and carry the cutting blades 7.

A plate 35 is secured by bolts 36 to the rear face of the boxing 12 and carries a tubular body 21. A rotatable shaft 19 is mounted in bearings 20 in said boxing, and carries a bevel-gear 18 within the boxing in mesh with said bevel-pinion 17. The shaft 19 passes entirely through the hollow of the body 21, and has a crank 24 fixed on its outer end supplied with a handle 25. On one side of the body 21 are spaced brackets or arms 22 connected by a side-handle 23. The body 21 is connected by braces 26 and 27 to the side-plates 1 and 2.

Referring now to Figs. 4 and 5, the side-plate 1 at its lower end, and a downward extension 13 of the side-plate of the boxing 12, have on their opposed inner faces raised parts or strips 42 supplied with rows of sockets 43 and 44 respectively, the sockets 43 being square and the sockets 44 round. A non-rotatable shaft is composed of parts 31 and 32 connected together, the part 32 being enlarged and having an interiorly-threaded hollow to receive the exteriorly-threaded end of the part 31, nuts 33 and 34 on the part 31 holding the part 32 in an adjusted position. Traveling-wheels 28 and 29 are rotatably mounted on the outer ends of the axle-parts 31 and 32, against stop-collars 40 thereon. The end 41 of the axle-part 31 is squared to fit either square socket 43 to prevent rotation of the axle, but the outer end of the axle-part 32 is round to rotatably fit either round socket 44'. The socketed part of the axle-part 32 may be screwed up on the threaded end of the axle-part 31 when the nuts 33—34 are shifted, to withdraw the rounded end of the axle from the socket 44, so that the axle can be removed when necessary. The squared end of the axle in the squared socket 43 prevents rotation of the axle-part 31. The axle can be mounted in said sockets to adjustably vary its height from the surface traversed, to regulate the height of cut of the blades 7.

The numeral 30 denotes the circumferentially dentated disk centrally orificed to receive the end of the shaft 32 and placed against the outer face of the traveling-wheel 29. The disk has a concentric circular rim 38 fitting removably about the circumferential edge of the wheel 29, and also has oppositely located threaded fixed studs 37 passed through orifices 45 in the wheel 29 and secured thereto by means of nuts 39. When thus mounted, the teeth on said disk 30 enter the ground and prevent side-slip of the mower while traversing sloping surfaces. The two-part axle 31—32 lends itself admirably to the purpose of mounting and dismounting the dentated disk 30 when necessary, taking but little time in the operation.

The geared driving mechanism is very simple, easily manipulated, and being boxed in, is kept free from dust and grass clippings.

Having described my invention, what I claim as new, and desire to secure by Letters Patent, is:

1. In combination, a frame, rotatable cutting-blades mounted therein, pluralities of oppositely-placed bearing sockets located in said frame, the sockets on one side being round, those on the opposite side with angular walls, a sectional axle whose parts have a screw and thread adjustment connection to permit of lengthening or shortening it, the journal of one axle-part being round to fit interchangeably the round bearing-sockets on the same side, and the journal of the other part being angular to fit the angular sockets on the opposite side non-rotatively.

2. In combination, a frame, rotatable cutting-blades mounted therein, pluralities of oppositely-placed bearing sockets located in said frame, the sockets on one side being round, those on the opposite side being squared, a two-part axle, one part having an interiorly-threaded socket, the other part having an exteriorly-threaded end adjustably seated in said socket, a lock-nut on said threaded end, the journal of the socketed axle-part being interchangeably rotatably seated in the round bearing-sockets, the outer end of the other axle-part being squared to interchangeably and non-rotatably fit in any of the said squared bearing-sockets, and traveling-wheels rotatably mounted on said axle-parts.

3. In combination, a frame, rotatable cutting-blades mounted therein, pluralities of bearing sockets oppositely-placed in said frame, the sockets on one side being round, those on the opposite side square, a two-part axle, one part having an interiorly-threaded socket, the other part having an exteriorly-threaded end adjustably seated in said socket, a lock-nut on said threaded end, the journal of the socketed axle-part being rotatably mounted in any of the round bearing-sockets, the outer end of the other axle-part being squared and seated interchangeably non-rotatably in any of the said square sockets, traveling-wheels rotatably mounted on said axle-parts, a circumferentially dentated disk removably mounted on the journal of said socketed axle-part and having an annular rim fitting about the circumferential periphery of the traveling-wheel thereon, and means for detachably securing said disk to said traveling-wheel.

4. In combination, a boxing, a shaft rotatably mounted in said boxing and extending through one wall thereof, a crank on the outer end of said shaft, a bevel-gear on said shaft within said boxing, a side-plate spaced from said boxing, bearings on said boxing and said side-plate, a shaft rotatably mounted in said bearings, extending into said boxing, a bevel-pinion on said shaft within said boxing in mesh with said bevel-gear, cutting-blades mounted on said shaft, an adjustable shear-plate connected between said boxing and said side-plate coöperating shearingly with said cutting-blades successively when the blades are rotated with said shaft, and means for transportation mounted between the lower parts of said boxing and said side-plate.

5. In combination, a boxing, a shaft rotatably mounted in said boxing and extending through one wall thereof, a crank on the outer end of said shaft, a bevel-gear on said shaft within said boxing, a side-plate spaced from said boxing, bearings on said boxing and said side-plate, a shaft rotatably mounted in said bearings, extending into said boxing, a bevel-pinion on said shaft within said boxing in mesh with said bevel-gear, cutting-blades mounted on said shaft, a shear-plate connected between said boxing and said side-plate adapted to coöperate shearingly with said cutting-blades successively when the blades are rotated with said shaft, and means for transportation mounted between the lower parts of said boxing and said side-plate, a cover removably mounted upon said boxing, means for detachably securing said cover to said boxing, and a cover fixedly connected between the upper parts of said boxing and said side-plate over said cutting-blades.

Signed at Waterloo, Iowa, this 12th day of Dec., 1916.

TIELKO K. BUNGER.

Witnesses:
PEARL M. STANTON,
G. C. KENNEDY.